Sept. 11, 1928.  G. D. WATSON  1,683,745
OIL WELL APPARATUS
Filed Jan. 11, 1926

INVENTOR,
George D. Watson;
BY Blakeslee Brown,
ATTORNEYS.

Patented Sept. 11, 1928.

1,683,745

UNITED STATES PATENT OFFICE.

GEORGE D. WATSON, OF TORRANCE, CALIFORNIA.

OIL-WELL APPARATUS.

Application filed January 11, 1926. Serial No. 80,662.

This invention relates to oil well apparatus and in particular to certain elements used in rotary drilling apparatus. The invention has direct application to the drive bushing through which the grief stem is passed and which is used for maintaining the grief stem so that the grief stem is rotated when the rotary table is turned. The drive bushing is subject to severe stress and as a result drive bushings are rapidly worn out or at best allow so much free movement of grief stem after a certain number of hours of use as to require new drive bushings.

My invention is so adapted as to render the replacement of drive bushings unnecessary, and to that end I have so formed the drive bushing that certain parts thereof are replaceable, all to the end that the life of a drive bushing is increased many fold.

The invention has for an object the provision of a drive bushing which is inexpensive of manufacture, simple of construction and generally superior in point of durability and general efficiency.

With the above and other objects in view, the invention consists in the novel and useful provision, construction, association and relative arrangement of parts, members and features, all as shown in a certain embodiment in the accompanying drawing, described generally, and more particularly pointed out in claims.

In the drawing.

Corresponding parts in all the figures are designated by the same reference characters.

Figure 1:
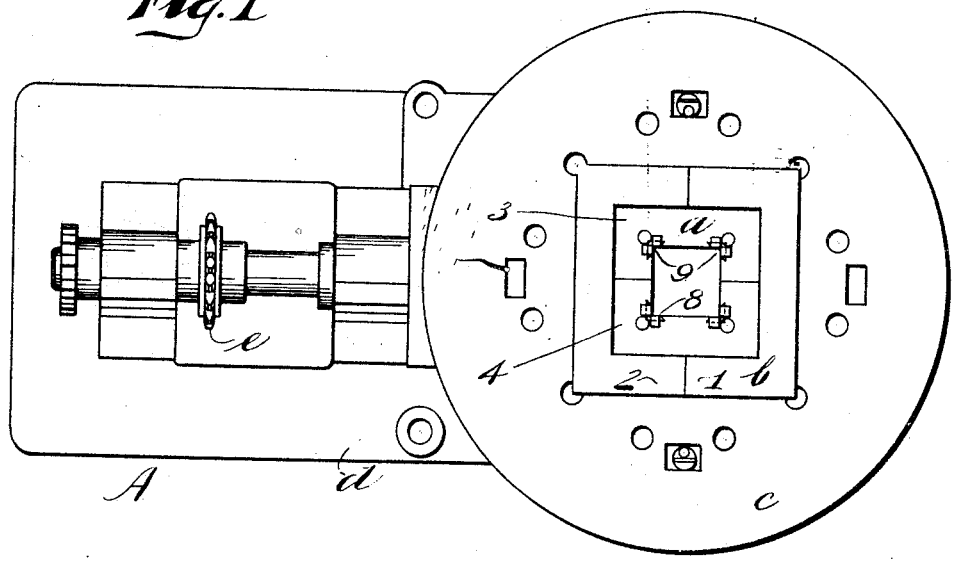
Figure 1 is a plan view of rotary drilling apparatus incorporating the invention.
Figure 2:
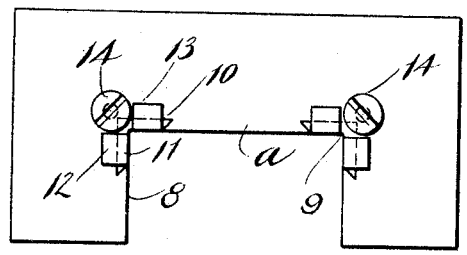
Figure 2 is an enlarged plan view of one of the drive bushings incorporating the invention.
Figure 3:
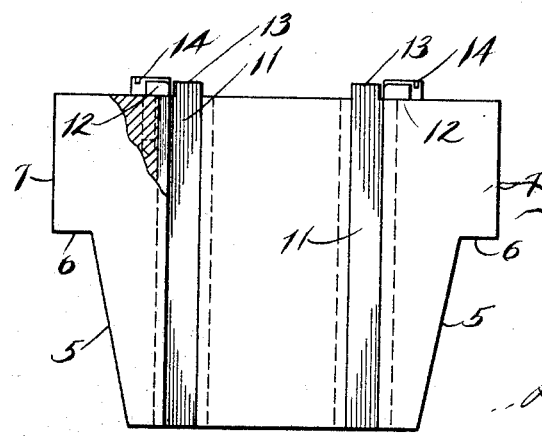
Figure 3 is an elevation of such drive bushing.

Referring with particularity to the drawing, the rotary drilling table incorporating the invention is designated as an entirety by A of which $a$ is a drive bushing, and $b$ a master bushing, both of which elements may be used in practicing one embodiment of the invention. At $c$ I have shown a rotary table which is provided with a central opening adapted to receive both the master bushing and the drive bushing. This rotary table is suitably mounted for rotation upon a base $d$ and drive means $e$ is adapted to turn the table $c$, and as a consequence turn the bushings $a$ and $b$. The master bushing is common of form and is made in two parts 1 and 2 which cooperate to hold the drive bushing which is formed in two parts as shown at 3 and 4. Each section of the drive bushing is provided in part with tapered side walls 5 terminating in a shoulder 6, which shoulder joins straight-sided walls 7 and each part is provided with a recess 8 adapted to correspond with the general shape of the grief stem which is square, and to this end the said sections 3 and 4, when cooperating as shown in Fig. 1, form a squared opening for said grief stem. The chief point of wear in the average drive bushing is adjacent the corner portions 9 of each section. This is true for the reason that due to the turning of the grief stem when the rotary table is rotated, and likewise due to shock, the portions adjacent the corner of each half of the drive bushing is rapidly worn so that there is considerable spacing between the periphery of the grief stem and the recessed portion of the drive bushing. As a result the average drive bushing must be replaced with new bushings in order that the proper functioning and turning of the grief stem is made possible. With my invention I slot each half of the bushing adjacent the corner portions, as shown at 10. These slots 10 extend the length of the said bushing halves, as shown in Fig. 3. Adapted to be received in such recesses are insets 11 and it is to be noted that the slots 10 are of the dovetail type and that these insets 11 are formed to have dove-tail fit within such slots. The insets are of the angle iron type, and each inset 11 is provided with two top pieces or lugs 12 and 13 which are spaced apart and at substantially right angles to the body portion of the inset, and the pieces 12 and 13 being upset or bent over and adapted to rest in part upon the top surface of the drive bushing halves. A lock screw 14 is received within the drive bushing, and has its head intermediate the two lugs or pieces 12 and 13 in such a position as to impinge upon a corner portion of such inset and hold the inset to the bushing. The description just given is for one inset, but the others are identical and similarly held to corners of the drive bushing. These insets are preferably made from some substance having greater wear resistance properties than the body of the bushing, and as they become worn and replacement becomes necessary any one or all of the insets may be removed and new ones placed therein. The saving in the cost of bushings is immediately apparent, as only a small part of the bushing must be replaced.

It is obvious that various changes and modifications may be made in practicing the invention, in departure from the particular showing of the drawing, without departing from the true spirit of the invention.

Having thus disclosed my invention, I claim and desire to secure by Letters Patent:

1. Improvements of the character disclosed, including a bushing formed with a squared opening, an inset received within said squared opening and at a corner portion thereof, and means for maintaining said inset to said bushing, comprising a lug member carried by the inset and bent over one end of the bushing.

2. Improvements of the character disclosed, including a bushing formed with a squared opening, an inset received within said squared opening and at a corner portion thereof, and means for maintaining said inset to said bushing, comprising a lug member carried by the inset and bent over one end of the bushing, and further means for locking the inset to the bushing.

In testimony whereof, I have signed my name to this specification.

GEORGE D. WATSON.